United States Patent [19]

Kato et al.

[11] Patent Number: 5,380,781
[45] Date of Patent: Jan. 10, 1995

[54] CATIONICALLY ELECTRODEPOSITABLE FINE PARTICLES DERIVED FROM ALKOXYSILANE-MODIFIED EPOXY RESINS AND CATIONIC ELECTRODEPOSITION PAINT COMPOSITION COMPRISING THE SAME

[75] Inventors: Kiyoshi Kato, Oiso; Kenichi Yoneyama, Chigasaki; Haruo Nagaoka; Kenji Yamamoto, both of Hiratsuka; Kazuyuki Morimoto, Nagoya; Masafumi Kume, Hiratsuka, all of Japan

[73] Assignee: Kansai Paint Co., Ltd., Hyogo, Japan

[21] Appl. No.: 95,210

[22] Filed: Jul. 23, 1993

[30] Foreign Application Priority Data

Jul. 27, 1992 [JP] Japan .................................. 4-218699
Apr. 7, 1993 [JP] Japan .................................. 5-103726

[51] Int. Cl.6 .................... C09D 5/44; C08G 59/18
[52] U.S. Cl. .................................... 523/404; 523/415; 523/421; 523/425; 525/476; 528/27
[58] Field of Search ............... 523/404, 415, 421, 425; 528/27; 525/476

[56] References Cited

U.S. PATENT DOCUMENTS

| | | | |
|---|---|---|---|
| 3,984,299 | 10/1976 | Jerabek | 204/181 |
| 4,017,438 | 4/1977 | Jerabek et al. | 260/29.2 EP |
| 4,025,474 | 5/1977 | Porter, Jr. et al. | 260/22 CQ |
| 4,332,711 | 6/1982 | Kooymans et al. | 523/402 |
| 4,528,363 | 7/1985 | Tominaga | 528/370 |
| 4,975,475 | 12/1990 | Tsuchiya et al. | 523/411 |
| 4,987,178 | 1/1991 | Shibata et al. | 524/547 |
| 4,988,778 | 1/1991 | Chang et al. | 525/476 |
| 5,021,530 | 6/1991 | Yamamoto et al. | 526/323.2 |
| 5,039,385 | 8/1991 | Tominaga | 523/425 |
| 5,096,556 | 3/1992 | Corrigan et al. | 204/181.7 |

FOREIGN PATENT DOCUMENTS

| | | |
|---|---|---|
| 153600 | 9/1985 | European Pat. Off. . |
| 0398755 | 11/1990 | European Pat. Off. . |
| 411576 | 2/1991 | European Pat. Off. . |
| 2166262 | 7/1973 | Germany . |
| 43013 | 3/1984 | Japan . |
| 67396 | 4/1984 | Japan . |
| 47178 | 10/1986 | Japan . |
| 3-028278 | 6/1991 | Japan . |
| 967051 | 8/1964 | United Kingdom . |

*Primary Examiner*—Frederick Krass
*Attorney, Agent, or Firm*—Wenderoth, Lind & Ponack

[57] ABSTRACT

Cationically electrodepositable (gelled) fine particles using, as the base, an epoxy resin-amine adduct having hydrolysable alkoxysilane groups, and a cationic electrodeposition paint composition comprising said fine particles. Said fine particles give a paint film having excellent corrosion resistance and are useful as a rheology-controlling agent for cationic electrodeposition paint. Said electrodeposition paint composition has an excellent edge-covering property, and a paint film formed therewith on an article to be coated can give improved corrosion resistance to the edges of said article and has good surface smoothness.

10 Claims, No Drawings

CATIONICALLY ELECTRODEPOSITABLE FINE PARTICLES DERIVED FROM ALKOXYSILANE-MODIFIED EPOXY RESINS AND CATIONIC ELECTRODEPOSITION PAINT COMPOSITION COMPRISING THE SAME

The present invention relates to cationically electro-depositable fine particles. More particularly, the present invention relates to cationically electrode-positable fine particles using, as the base resin, an epoxy resin-amine adduct having hydrolysable alkoxysilane groups, as well as to a cationic electrodeposition paint composition comprising said fine particles, capable of forming a paint film which has excellent surface smoothness and which is sufficiently thick even at the edges (e.g. corners, protrudent portions) of the coated article.

Gelled fine particle polymers produced by crosslinking within particles (hereinafter referred to as "intraparticle crosslinking") and processes for production thereof have been widely known. These processes include, for example, a process which comprises subjecting a monomer mixture containing a monomer (for crosslinking) having at least two ethylenic double bonds, to emulsion polymerization in an aqueous system (U.K. Pat. No. 967051, U.S. Pat. No. 4,975,475) and a process which comprises subjecting a monomer mixture containing glycidyl (meth)acrylate, (meth)acrylic acid, etc. to dispersion polymerization in a non-aqueous system using a dispersion stabilizer and simultaneously giving rise to a reaction between the functional groups of the monomers (U.S. Pat. No. 4,025,474).

With respect to the process for producing a gelled fine particle polymer in an aqueous system using an alkoxysilane monomer, there are various proposals such as a process which comprises emulsion-polymerizing a mixture of an alkoxysilane monomer and other monomer in an aqueous medium using an unreactive surfactant (EP-A-153600), a process which comprises copolymerizing an alkoxysilane monomer, (meth)acrylic acid and other monomer and then making the resulting copolymer into an aqueous dispersion for formation of a matte electro-deposition paint film for aluminum building materials (Japanese Laid-Open Pat. Application No. 67396/1984), a process for producing an aqueous solution composition comprising colloidal silica and an acrylic polymer having alkoxysilane groups and carboxyl groups (Japanese Patent Publication No. 47178/1986), and a process which comprises making an acrylic polymer having alkoxysilane groups and cationic groups into an aqueous dispersion and then giving rise to intraparticle crosslinking (U.S. Pat. No. 4,987,178).

The gelled fine particle polymers obtained by the conventional processes, when added to a paint composition, give favorable effects on the rheological property and physical properties of the composition and, as a result, show improvements in spraying efficiency of paint, prevention of sagging of paint film, pattern control of metallic pigment, etc.

Meanwhile, cationic electrodeposition paints widely used in various industries including the automobile industry have excellent corrosion resistance by themselves. They, however, have a drawback that they are inferior in edge-covering property and unable to give a sufficiently thick paint film at the edge(s) of an article to be coated. Hence, the improvement therefor has been desired.

In order to solve the above problem, the present inventors attempted the application of the above-obtained gelled fine particle polymers to cationic electrodeposition paints. Since the conventional gelled fine particle polymers are non-aqueous dispersions in many cases and, even when they are aqueous dispersions, are anionic or nonionic dispersions obtained by emulsion polymerization using an unreactive surfactant, it is generally difficult to use them in cationic electrodeposition paints. Even if the use is possible, the electrodeposition bath stability and electrodepositability of the resulting cationic electrodeposition paint and the water resistance and corrosion resistance of the paint film formed therewith are inferior, making impossible the practical application of the conventional gelled fine particle polymers in cationic electrodeposition paints.

The present applicant previously proposed an internally crosslinked gelled fine particle polymer having alkoxysilane groups, hydroxyl groups and cationic groups and a process for producing said polymer (U.S. Pat. No. 5,021,530). The present applicant also proposed an internally crosslinked gelled fine particle polymer having alkoxysilane groups, urethane bonds and hydroxyl groups and a process for producing said polymer (EP-A-411576). These internally crosslinked gelled fine particle polymers, which were proposed previously, have cationic electrodepositability and, when added to a cationic electrodeposition paint, do not impair the bath stability and electrodepositability of the paint, and the baked films formed therewith have an excellent edge-covering property. Said films, however, are slightly inferior in general corrosion resistance because said polymers are an acrylic resin, and are insufficient in practical application.

Gelled fine particles produced by using an epoxy resin (epoxy resins have excellent corrosion resistance) have also been known. There is proposed, for example, a cationic microgel dispersion obtained by making a mixture of a cationic polyepoxide-amine reaction product and a polyepoxy crosslinking agent, into an aqueous dispersion and then subjecting the particles in the resulting dispersion to intraparticle crosslinking (U.S. Pat. No. 5,096,556). The dispersion is inferior in rheology-controlling property and must be used in a large amount in order to impart a sufficient edge-covering property, and the use in a large amount gives an adverse effect on film surface smoothness.

Hence, the present inventors made study in order to develop cationically electrodepositable fine particles which have higher corrosion resistance than the conventional gelled fine particles and which are useful as a rheology-controlling agent for cationic electrodeposition paint. As a result, the present inventors have newly found that an aqueous dispersion of an epoxy resin-amine adduct having hydrolysable alkoxysilane groups gives rise to intraparticle crosslinking wherein the silanol groups formed by the hydrolysis of the alkoxysilane groups cause condensation with each other and, when hydroxyl groups are present, also with the hydroxyl groups, whereby gelled fine particles of very good dispersion stability are formed. These gelled fine particles have cationic electrodepositability and, when added to, for example, an ordinary cationic electrodeposition paint composition, do not impair the bath stability and electrodepositability of said composition and the water resistance and corrosion resistance of the paint film formed therewith, suppress the melt viscosity reduction of the electrodeposition paint film formed with said composition, during the baking and curing, and consequently can give a paint film having excellent surface smoothness and an excellent edge-covering property.

Therefore, according to one aspect of the present invention there are provided cationically electrodepositable gelled fine particles obtained by subjecting the fine particles of an epoxy resin-amine adduct having hydrolysable alkoxysilane groups, to intraparticle crosslinking in the presence of water.

According to another aspect of the present invention, there is provided a cationic electrodeposition paint composition comprising the above gelled fine particles in an amount of 1–35 % by weight based on (the) weight of total resin solids of the paint composition.

In the present invention, the "epoxy resin-amine adduct having hydrolysable alkoxysilane groups" refers to an adduct which has, as a water-dispersible group, amino groups neutralized with cationic groups, particularly an acid and can be stably dispersed in water and which, when dispersed in water, can become a gel by giving rise to intraparticle crosslinking wherein the silanol groups formed by the hydrolysis of the alkoxysilane groups cause condensation with each other and, when hydroxyl groups are present, also with the hydroxyl groups.

The "hydrolysable alkoxysilane groups" include those represented by the following formula

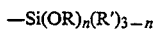

wherein R represents an alcohol residual group; R' represents an alkyl group of 5 or less carbon atoms, preferably 2 or less carbon atoms; and n is 2 or 3. The alcohol residual group represented by R includes, for example, the following groups:

(i) alcohol residual groups (alkyl groups) such as $-CH_3$, $-C_2H_5$, $-C_3H_7$, $-C_4H_9$, $-C_6H_{13}$, $-C_8H_{17}$ and the like;

(ii) ether alcohol residual groups (alkoxy alkyl groups) such as $-C_2H_4OCH_3$, $-C_2H_4OC_2H_5$, $-C_2H_4OC_3H_7$, $-C_2H_4OC_4H_9$, $-C_3H_6OCH_3$, $-C_3H_6OC_2H_5$, $-C_4H_8OCH_3$, $-C_2H_4OC_2H_4OCH_3$ $-C_2H_4OC_2H_4OC_2H_5$, $-C_2H_4OC_2H_4OC_4H_9$ and the like;

(iii) ester alcohol residual groups (alkanoyloxy alkyl groups or alkenylcarbonyloxyalkyl group) such as

and the like;

(iv) cycloalkyl alcohol or aralkyl alcohol residual groups (cycloalkyl groups or aralkyl groups) such as

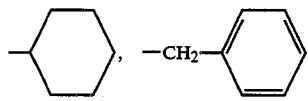

and the like;

(v) oxime alcohol residual groups represented by formula

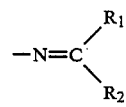

(wherein $R_1$ and $R_2$ each represent an alkyl group or, in combination, an alkylene group), for example,

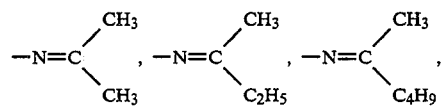

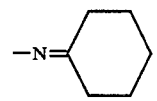

and the like, and (vi) heterocyclic alcohol residual groups such as

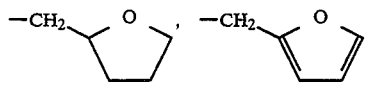

and the like.

A hydrolysable alkoxysilane group represented by $-Si(OR)_n(R')_{3-n}$ where R has less carbon atoms, is hydrolyzed more easily and, after the hydrolysis, causes condensation more easily, i.e. is inferior in stability in an aqueous system. Therefore, R in the above formula preferably has about 2–7 carbon atoms in view of the balance of hydrolysability and stability in an aqueous system. R having 2 or less carbon atoms and R having 8 or more carbon atoms may be used in combination for said balance.

The epoxy resin-amine adduct having hydrolysable alkoxysilane groups, used in the present invention can be prepared by introducing hydrolysable alkoxysilane groups into an epoxy resin-amine adduct which is a base material.

The epoxy resin-amine adduct as base resin includes polyamine resins ordinarily used in cationic electrodeposition paints, for example:

(i) adducts between a polyepoxide compound and a primary mono- or polyamine, a secondary mono- or polyamine or a primary and secondary mixed polyamine (e.g. U.S. Pat. No. 3,984,299);

(ii) adducts between a polyepoxide compound and a secondary mono- or polyamine having a primary amino group in the form of ketimine (e.g. U.S. Pat. No. 4,017,438); and (iii) reaction products obtained by etherification between a polyepoxide compound and a hydroxy compound having a primary amino group in the form of ketimine (e.g. Japanese Laid-Open Patent Application No. 43013/1984).

The polyepoxide compound used in the production of the above polyamine resin is preferably a compound having two or more epoxy groups

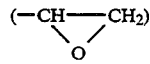

in the molecule, a number-average molecular weight of generally at least 200, preferably 400–4,000, more preferably 800–2,000, and an epoxy equivalent of generally at least 100, preferably 200–2,000, more preferably 400–1,000. Particularly preferable is a compound obtained by the reaction between a polyphenol compound and epichlorohydrin. The polyphenol compound used for the formation of the polyepoxide compound includes, for example, bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tert-butulphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenylsulfone, phenol novolac and cresol novolac.

The polyepoxide compound may have been partially reacted with a polyol, a polyether polyol, polyester polyol, a polyacid amine, a polycarboxylic acid, a polyisocyanate compound or the like, or may have been graftpolymerized with -caprolactone, an acrylic monomer or the like.

The method for introduction of the hydrolysable alkoxysilane groups into the epoxy resin-amine adduct (base resin) is not particularly restricted and can be appropriately selected from among per se known methods depending upon, for example, the kind of the hydrolysable alkoxysilane group to be introduced. However, it is preferable to select a method which produces no by-product (e.g. water-soluble salt) adversely affecting electrodeposition coating. Such a method can be exemplified by the following.

(1) A method of adding an alkoxysilane group-containing amine compound to the epoxy groups of a base resin.

Said amine compound includes the following, for example.

NH$_2$CH$_2$CH$_2$CH$_2$Si(OR)$_3$
NH$_2$CH$_2$CH$_2$NHCH$_2$CH$_2$CH$_2$Si(OR)$_3$

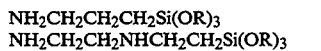

NH$_2$CH$_2$CH$_2$NHCH$_2$CH$_2$CH$_2$Si(OR)$_2$
|
CH$_3$

NHCH$_2$CH$_2$CH$_2$Si(OR)$_3$
|
CH$_3$
|
NHCH$_2$CH$_2$CH$_2$Si(OR)$_3$

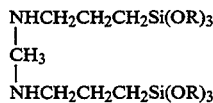

Si(OR)$_3$CH$_2$CH$_2$CH$_2$NHCH$_2$CH$_2$CH$_2$Si(OR)$_3$
CH$_3$CH$_2$CH$_2$CH$_2$NHCH$_2$CH$_2$CH$_2$Si(OR)$_3$ (2) A method of adding an alkoxysilane group-containing mercaptan to the epoxy groups of a base resin.

Said mercaptan includes the following, for example.

HSCH$_2$CH$_2$CH$_2$Si(OR)$_3$
HSCH$_2$CH$_2$Si(OR)$_3$

-continued
HSCH$_2$CH$_2$CH$_2$Si(OR)$_2$
|
CH$_3$ (3) A method of adding an alkoxysilane group-containing epoxy compound to the amino groups of a base resin.

Said epoxy compound includes the following, for example.

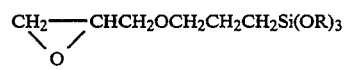

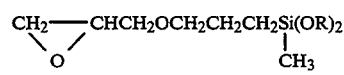

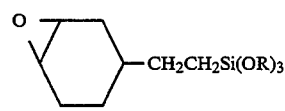

(4) A method of adding an alkoxysilane group-containing isocyanate compound to the hydroxyl groups and amino groups of a base resin.

Said isocyanate compound includes the following, for example.

OCNCH$_2$CH$_2$CH$_2$Si(OR)$_3$
OCNCH$_2$CH$_2$CH$_2$Si(OR)$_2$
CH$_3$

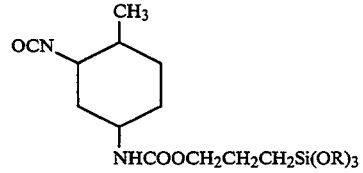

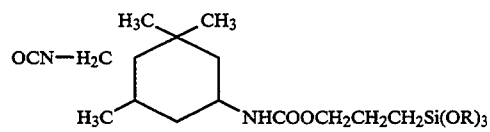

In the formulas shown in the above (1) to (4), R has the same definition as given previously.

The amount of the hydrolysable alkoxysilane groups in the epoxy resin-amine adduct having hydrolysable alkoxysilane groups is not particularly restricted but is appropriately in the range of ordinarily 500–200,000, preferably 1,000–40,000, more preferably 2,000–20,000 in terms of alkoxysilane equivalent (molecular weight per one alkoxysilane group).

The epoxy resin-amine adduct having alkoxysilane groups can be subjected, in the state of fine particles, to intraparticle crosslinking in the presence of water and thereby can be made into cationically electrodepositable gelled fine particles. Conveniently, the epoxy resin-amine adduct having hydrolysable alkoxysilane groups is dispersed in an aqueous medium in the form of fine particles and the fine particles in the resulting dispersion are subjected to internal crosslinking. The dispersion of the adduct in an aqueous medium can be achieved by a per se known method. It can be achieved, for example, by neutralizing, the epoxy resin-amine adduct having hydrolysable alkoxysilane groups with, for example, a water-soluble carboxylic acid (e.g. formic acid, acetic acid, lactic acid, hydroxyacetic acid) of about 0.1-1 equivalent for the amino groups present in the adduct and then dispersing the neutralized adduct in an aqueous medium so that the solid content in the resulting aqueous dispersion becomes about 40% by weight or less.

The thus obtained fine particles of the epoxy resin-amine adduct having hydrolysable alkoxysilane groups, dispersed in the aqueous medium can be subjected to intraparticle crosslinking. The intraparticle crosslinking may be allowed to occur to some extent by simply storing the aqueous dispersion for a long period of time but favorably is accelerated by heating the aqueous dispersion to a temperature of about 50° C. or more. Alternatively, the intraparticle crosslinking may be allowed to occur simultaneously with the dispersion of the epoxy resin-amine adduct having hydrolysable alkoxysilane groups in an aqueous medium, by adding a catalyst for condensation of silanol groups (e.g. tin octylate, zinc octylate, zirconium octylate, dibutyltin dilaurate) to a solution of the adduct or an aqueous medium and making an aqueous dispersion of the adduct in the presence of said catalyst.

The thus obtained aqueous dispersion of gelled fine particles can have a resin solid content of ordinarily 10-40% by weight, preferably 15-30% by weight. The diameters of the dispersed particles can be generally 0.5 μm or less, preferably 0.01-0.3 μm, more preferably 0.05-0.2 μm. The particle diameters can be easily controlled so as to be in a desired range, by controlling the amount of cationic groups in the epoxy resin-amine adduct having hydrolysable alkoxysilane groups.

The gelled fine particles of the present invention produced as above are cationically electrodepositable and, when added to a cationic electrodeposition paint, do not impair the bath stability and electrodepositability of said paint and the water resistance and corrosion resistance of the film formed with said paint, suppresses the melt viscosity reduction of the electrodeposition film formed with the paint, during the baking and curing, and consequently can give an electrodeposition paint film having excellent surface smoothness and an excellent edge-covering property.

It was also found in the present invention that the fine particles obtained by mixing an epoxy resin-amine adduct having hydrolysable alkoxysilane groups with at least one compound selected from the group consisting of a polyisocyanate compound blocked with an oxime compound and a polyepoxide compound and finely grinding the mixture, and the (gelled) fine particles obtained by subjecting said fine particles to internal crosslinking at least partially in the presence of water, are cationically electrodepositable as well and, when added to, for example, an ordinary cationic electrodeposition paint composition, do not impair the bath stability and electrodepositability of said composition and the water resistance and corrosion resistance of the paint film formed therewith, suppress the melt viscosity reduction of the electrodeposition paint film formed with said composition, during the baking and curing, and consequently can give a paint film having excellent surface smoothness and an excellent edge-covering property.

Therefore, according to the present invention there are provided cationically electrodepositable fine particles which are fine particles of a mixture of (A) an epoxy resin-amine adduct having hydrolysable alkoxysilane groups and (B) at least one compound selected from the group consisting of (B-1) a polyisocyanate compound blocked with an oxime compound and (B-2) a polyepoxide compound, or which are fine particles obtained by subjecting said fine particles to intraparticle crosslinking at least partially in the presence of water; and a cationic electrodeposition paint composition comprising said fine particles in an amount of 1-35% by weight based on (the) weight of total resin solids of the paint composition.

The polyisocyanate compound (B-1) blocked with an oxime compound, used in combination with the adduct (A) in the preparation of the cationically electrodepositable fine particles of the second aspect of the present invention, is an adduct between a polyisocyanate compound having at least two isocyanate groups in the molecule and an oxime compound. Said polyisocyanate compound includes, for example, aromatic, alicyclic or aliphatic polyisocyanate compounds such as diphenylmethane diisocyanate, tolylene diisocyanate, xylene diisocyanate, phenylene diisocyanate, dicyclohexylmethane diisocyanate, bis(isocyanatemethyl)cyclohexane, tetramethylene diisocyanate, hexamethylene diisocyanate, methylene diisocyanate, isophorone diisocyanate and the like; and isocyanate-terminated compounds obtained by reacting an excess amount of the above isocyanate compound with an active hydrogen-containing low-molecular compound such as ethylene glycol, propylene glycol, trimethylolpropane, hexanetriol, castor oil or the like. Of them, diphenylmethane diisocyanate, tolylene diisocyanate, a poly(diphenylmethane diisocyanate) and isocyanate-terminated prepolymers obtained by the reaction between one of said compounds and a polyol are preferred because these polyisocyanates, when blocked with said oxime compound, are dissociable at relatively low temperatures.

The oxime compound used for blocking the isocyanate groups in the polyisocyanate compound can be a per se known oxime compound ordinarily used for the blocking of polyisocyanate compound. It includes, for example, methyl ethyl ketoxime, acetone oxime, methyl isobutyl ketoxime, diacetylmonoxime, benzophenone oxime and cyclohexane oxime. The blocking of the polyisocyanate compound by such an oxime compound can be conducted by reacting a polyisocyanate compound with an oxime compound according to a per se known process.

The polyepoxide compound (B-2) is a compound having at least two epoxy groups in the molecule, and can be the same polyepoxide compound as mentioned previously, used in the production of an epoxy resin-amine adduct having hydrolysable alkoxysilane groups.

The mixing proportions of (A) the epoxy resin-amine adduct having hydrolysable alkoxysilane groups and (B) the compound selected from an oxime-blocked polyisocyanate compound (B-1) and a polyepoxide compound (B-2) are not strictly restricted and may be varied depending upon the application purpose of the product fine particles. However, the appropriate mixing proportions of the components (A) and (B) are such that the molar equivalent ratio of the total of the isocyanate groups and epoxy groups in the component (B) to the amino groups in the component (A) becomes 0.3-20, preferably 0.5-10, more preferably 1-4. When the component (B) is used in an equivalent ratio exceeding the above range, the emulsion stability of the aqueous dispersion obtained and the surface smoothness of the paint film obtained are adversely affected in some cases.

The mixture obtained by thorough mixing of the components (A) and (B) can be made into fine particles conveniently by dispersing the mixture in an aqueous medium. This can be conducted by a per se known method. For example, it can be conducted by neutralizing the mixture with an acid, for example, a water-soluble carboxylic acid (e.g. formic acid, acetic acid, hydroxyacetic acid) of 0.1-1 equivalent for the amino groups present in the mixture and then dispersing the neutralized mixture in an aqueous medium so that the solid content becomes about 40% by weight or less.

By the above operation, there are formed emulsion particles presumably having a structure in which the component (B) is surrounded by the component (A).

In the thus obtained emulsion particles consisting of the components (A) and (B), the amino groups (and hydroxyl groups in some cases) in the component (A) react with the isocyanate groups and/or epoxy groups in the component (B), and/or the silanol groups formed by the hydrolysis of the alkoxysilane groups in the component (A) cause condensation with each other and/or hydroxyl groups, whereby the emulsion particles give rise to intraparticle crosslinking to form (gelled) fine particles.

Therefore, the emulsion particles can be optionally subjected to intraparticle crosslinking at least partially. The intraparticle crosslinking may be allowed to occur to some extent by simply storing the aqueous dispersion for a long period of time but conveniently is accelerated by heating the aqueous dispersion to a temperature of about 50° C. or more, preferably 70° C. or more. The intraparticle crosslinking may be accelerated by, at the time of making the mixture of the components (A) and (B) into an aqueous dispersion, as necessary adding, to the resin solution or an aqueous medium, a catalyst such as tin octylate, zinc octylate, zirconium octylate, dibutyltin dilaurate, an imidazole type compound or the like.

The fine particles of the present invention include emulsion particles having such a structure as the component (B) is surrounded by the component (A), which is obtained by dispersing in aqueous medium the mixture of the components (A) and (B); gelled fine particles obtained by subjecting said emulsion particles to intraparticle crosslinking; and fine particles obtained by simply storing said emulsion particles for a long period of time, wherein intraparticle crosslinking has occurred to some extent. The fine particles of the present invention may be either one of the above three kinds or a mixture thereof. Use of gelled fine particles is particularly preferable in view of the edge-covering property.

The thus obtained aqueous dispersion of the fine particles of the present invention may have a resin content of ordinarily about 10-about 40% by weight, preferably 15-30% by weight. The diameters of the dispersed particles may be in the range of generally 0.5 $\mu$m or less, preferably 0.01-0.3 $\mu$m, more preferably 0.05-0.2 $\mu$m. The particle diameters can be easily controlled in a desired range by controlling the amount of the cationic groups of the epoxy resin-amine adduct having hydrolysable alkoxysilane groups.

The fine particles of the first and second aspects of the present invention produced as mentioned above have cationic electrodepositability and, when added to a cationic electrodeposition paint, do not impair the bath stability and electrodepositability of said paint and the water resistance and corrosion resistance of the electrodeposition film formed with said paint, favorably suppress the melt viscosity reduction of the electrodeposition film formed with said paint, during the baking and curing, and consequently can give an electrodeposition paint film having excellent surface smoothness and edge-covering property.

Hence, according to the present invention, there is provided a cationic electrodeposition paint composition comprising the fine particles of the present invention. The components other than the fine particles of the present invention in the cationic electrodeposition paint composition are not particularly restricted and can be substantially the same as in ordinary cationic electrodeposition paint compositions.

The cationic electrodeposition paint composition of the present invention may comprise, as a resin component other then the fine particles of the present invention, a resin used in ordinary cationic electrodeposition paints (hereinafter referred to as resin for cationic electrodeposition paint, in some cases), for example, a polyamine resin represented by an amine-added epoxy resin, for example, the epoxy resin-amine adduct used as a base resin in the production of the above-mentioned (gelled) fine particles.

When the composition of the present invention is required to give a cured paint film of good weather resistance, the composition preferably comprises, as a resin component other than the fine particles, an amino group-containing acrylic resin or a nonionic acrylic resin both having excellent weather resistance singly or in combination with the above-mentioned amine-added epoxy resin.

The amine-added epoxy resin may be, as necessary, cured using a polyisocyanate compound blocked with an alcohol or the like.

There may also be used an amine-added epoxy resin which can be cured without using any blocked isocyanate compound. There may be used, for example, a resin obtained by introducing $\beta$-hydroxyalkylcarbamate group into a polyepoxide substance (e.g. U.S. Pat. No. 4,528,363) and a resin which can be cured by an ester interchange reaction (U.S. Pat. No. 4,332,711).

The above-mentioned resin for cationic electrodeposition paint can be made into a cationic aqueous solution or dispersion by neutralizing said resin with a water-soluble organic acid (e.g. formic acid, acetic acid, lactic acid), followed by dissolution or dispersion in water.

The thus obtained cationic electrodeposition paint solution or dispersion in water and the above-mentioned aqueous dispersion of fine particles are mixed so that the amount of the fine particles in the mixture becomes 1-35% by weight, preferably 4.5-20% by weight based on (the) weight of total resin solids of the paint composition (the total of the resin for cationic electrodeposition paint and the fine particles), whereby a cationic electrodeposition paint composition of the present invention can be obtained. When the amount of the fine particles in the electrodeposition paint composition is less than 1% by weight based on (the) weight of total resin solids of the paint composition, the effect of the fine particles on the suppression of the melt viscosity reduction of electrodeposition paint film during baking is low and the edge-covering property of electrodeposition paint film tends to be insufficient. Meanwhile, when said amount is more than 35% by weight, the surface smoothness of electrodeposition paint film may be inferior.

The cationic electrodeposition paint composition of the present invention may further comprise, as necessary, additives ordinarily used in paints, for example, coloring pigments such as titanium white, carbon black, red iron oxide, chrome yellow and the like; extender pigments such as talc, calcium carbonate, mica, clay, silica and the like; and rust preventive pigments such as chromium pigment (e.g. strontium chromate, zinc chromate), lead pigment (e.g. basic lead silicate, lead chromate) and the like.

The cationic electrodepositon paint composition of the present invention can be coated on a desired material to be coated, by cationic electrodeposition coating. The cationic electrodeposition coating can be conducted by a per se known method and ordinarily by diluting the cationic electrodeposition paint composition of the present invention with deionized water or the like so that the solid content becomes about 5–40% by weight, then making pH adjustment so as to give a pH of 5.5–8.0 to prepare an electrodeposition bath comprising the cationic electrodeposition paint composition of the present invention, and then carrying out electrodeposition in the bath under the conditions of 15°–35° C. (bath temperature) and 100–400 V (applied voltage) using an article to be coated, as the cathode.

The preferable film thickness formed in the electrodeposition coating using the paint composition of the present invention is not particularly restricted but is generally 10–40 μm in terms of cured film thickness. The appropriate baking temperature for paint film is generally 100°–200° C.

The cationically electrodepositable fine particles produced by the present invention, where added to a cationic electrodeposition paint, are electrodepositable without causing cohesion, abnormal electrodeposition, precipitation, etc., act a flow-controlling agent during the baking of the electrodeposition paint film formed, and exhibit various effects such as cratering prevention, surface smoothness, edge-covering property and the like. These effects are exhibited even when the fine particles of the second aspect of the present invention are emulsion particles which are not yet gelled. The reason therefor is presumed to be that the emulsion particles cause intraparticle crosslinking during the baking of electrodeposition paint film before the film begins to heat-flow and, as a result, suppress the melt viscosity reduction of the film during the baking.

The film formed with the electrodeposition paint composition of the present invention has a microseparating structure and shows greatly improved properties.

The cationic electrodeposition paint composition of the present invention has excellent bath stability and electrodepositability and can suppress the viscosity reduction of the film formed therewith during the heat curing of the film. Consequently, said composition can form a paint film of excellent edge-covering property (this gives improved rust prevention to the edge(s) of an article to be coated) and good surface smoothness.

The present invention is hereinafter described more specifically by way of Examples. However, the present invention is in no way restricted to these Examples. In Examples and Comparative Examples, parts and % refer to parts by weight and % by weight, respectively.

[Part I]

Preparation of Epoxy Resin-Amine Adducts Having Hydrolysable Alkoxysilane groups

PREPARATION EXAMPLE 1

An epoxy resin-amine adduct having hydrolysable alkoxysilane groups was prepared in accordance with the following compounding recipe.

| Raw materials | Parts by weight |
| --- | --- |
| Epon 828EL*[1] | 1045 |
| Bisphenol A | 171 |
| Diethanolamine | 52.2 |
| KBE-903*[2] | 221 |
| Diethanolamine | 157.5 |
| Ethylene glycol monobutyl ether | 706 |

*[1]Diglycidyl ether of bisphenol A having an epoxy equivalent of about 190, manufactured by Yuka Shell Epoxy K.K.
*[2]γ-Aminopropyltriethoxysilane manufactured by Shin-Etsu Chemical Co., Ltd.
*[3]Measured in accordance with JIS K 7236. Amino groups were included into epoxy groups by calculation.
*[4]Acetylation with acetic anhydride was conducted, after which titration with perchloric acid was conducted using Crystal Violet as an indicator.

Into a reactor provided with a thermometer, a stirrer, a reflux condenser and a nitrogen gas inlet tube were charged Epon 828EL, bisphenol A and diethanolamine with nitrogen gas being blown thereinto. The reactor contents were heated to 120° C. and reacted until the epoxy equivalent (*3) of the reaction product reached a theoretical value (317). The reaction mixture was cooled to 80° C. and KBE-903 and diethanolamine were added. The mixture was reacted until the tertiary amine value (*4) of the reaction mixture reached a theoretical value (102). Then, dilution was made with ethylene glycol monobutyl ether to obtain an ethylene glycol monobutyl ether solution containing 70% (as solid content) of an epoxy resin-amine adduct having hydrolysable alkoxysilane groups, having a number-average molecular weight of about 1650.

*3 Measured in accordance with JIS K 7236. Amino groups were included into epoxy groups by calculation.

*4 Acetylation with acetic anhydride was conducted, after which titration with perchloric acid was conducted using Crystal Violet as an indicator.

PREPARATION EXAMPLE 2

An epoxy resin-amine adduct having hydrolysable alkoxysilane groups was prepared in accordance with the following compounding recipe.

| Raw materials | Parts by weights |
| --- | --- |
| Epon 828EL | 950 |
| Bisphenol A | 342 |
| Diethanolamine | 52.5 |
| X-12-636*[5] | 289.5 |
| Ethylene glycol monobutyl ether | 700 |

*[5]N-methyl-γ-aminopropyltrimethoxysilane manufactured by Shin-Etsu Chemical Co., Ltd.

Into the same reactor as used in Preparation Example 1 were charged Epon 828EL, bisphenol A and diethanolamine with nitrogen gas being blown thereinto. The reactor contents were heated to 120° C. and reacted until the epoxy equivalent of the reaction mixture reached a theoretical value (672). The reaction mixture was cooled to 80° C. and X-12-636 was added. The mixture was reacted until the tertiary amine value of the reaction mixture reached a theoretical value (69). Then, dilution was made with ethylene glycol monobutyl ether to obtain an ethylene glycol monobutyl ether solution containing 70% (as solid content) of an epoxy resinamine adduct having hydrolysable alkoxysilane groups, having a number-average molecular weight of about 1600.

PREPARATION EXAMPLE 3

An epoxy resin-amine adduct having hydrolysable alkoxysilane groups was prepared in accordance with the following compounding recipe.

| Raw materials | Parts by weight |
|---|---|
| Epon 828EL | 950 |
| Bisphenol A | 342 |
| Amine A*[6] | 96.5 |
| Amine A (post-addition) | 193 |
| Amine B*[7] | 159 |
| Deionized water | 36 |
| KBE-402*[8] | 496 |
| Ethylene glycol monobutyl ether | 486 |

*[6] A methyl isobutyl ketone solution containing 74% (as solid) of a ketimine between monoethanolamine and methyl isobutyl ketone
*[7] A methyl isobutyl ketone solution containing 84% (as solid) of methyl isobutyl ketone diketimine of diethylenetriamine
*[8] γ-Glycidoxypropylmethyldiethoxysilane manufactured by Shin-Etsu Chemical Co., Ltd.

Into the same reactor as used in Preparation Example 1 were charged Epon 828EL, bisphenol A and amine A with nitrogen gas being blown thereinto. The reactor contents were heated to 160° C. and reacted until the epoxy equivalent of the reaction mixture reached a theoretical value (694). The reaction mixture was cooled to 100° C., and amine A and amine B were added. The mixture was reacted until the tertiary amine value of the reaction mixture reached a theoretical value (97). Deionized water was added and a reaction for hydrolysis of ketimine was conducted at 100° C. Subsequently, KBE-402 was added and a reaction was conducted until no epoxy group was present. Then, dilution was made with ethylene glycol monobutyl ether to obtain an ethylene glycol monobutyl ether solution containing 70% (as solid content) of an epoxy resin-amine adduct having hydrolysable alkoxysilane groups, having a number-average molecular weight of about 1,900.

Preparation of Gelled Fine Particles

EXAMPLE 1

Into a two-liter flask were charged 100 parts of the epoxy resin-amine adduct having hydrolysable alkoxysilane groups, obtained in Preparation Example 1 and 11 parts of 10% acetic acid. The flask contents were stirred at 30° C. for 5 minutes. Thereto was dropwise added 239 parts of deionized water in about 30 minutes with vigorous stirring. The mixture was heated to 50° C. and stirred for about 3 hours.

Thus there was obtained an opaque white dispersion containing 20% (as solid content) of gelled fine particles subjected to intraparticle crosslinking. The fine particles had an average particle diameter of 0.15 μm in ethylene glycol monobutyl ether.

EXAMPLE 2

Into a two liter flask were charged 100 parts of the epoxy resin-amine adduct having hydrolysable alkoxysilane groups, obtained in Preparation Example 2 and 7.5 parts of 10% acetic acid. The flask contents were stirred at 30° C. for 5 minutes. Thereto was dropwise added 242.5 parts of deionized water in about 30 minutes with vigorous stirring. The mixture was heated to 50° C. and stirred for about 3 hours.

Thus there was obtained an opaque white dispersion containing 20% (as solid content) of gelled fine particles subjected to intraparticle crosslinking. The fine particles had an average particle diameter of 0.15 μm in ethylene glycol monobutyl ether.

EXAMPLE 3

Into a two-liter flask were charged 100 parts of the epoxy resin-amine adduct having hydrolysable alkoxysilane groups, obtained in Preparation Example 3 and 11 parts of 10% acetic acid. The flask contents were stirred at 30° C. for 5 minutes. Thereto was dropwise added 239 parts of deionized water in about 30 minutes with vigorous stirring. The mixture was heated to 50° C. and stirred for about 3hours.

Thus there was obtained an opaque white dispersion containing 20% (as solid content) of gelled fine particles subjected to intraparticle crosslinking. The fine particles had an average particle diameter of 0.15 μm in ethylene glycol monobutyl ether.

Preparation of Cationic Electrodeposition Paint Compositions

EXAMPLE 4

100 parts of the dispersion containing 20% (as solid content) of gelled fine particles, obtained in Example 1 and 139.4 parts of the following pigment paste having a solid content of 43% were added to 572 parts of a clear emulsion for cationic electrodeposition (solid content =35%) (Electron 9450 manufactured by KANSAI PAINT CO., LTD.) comprising a polyamide-modified epoxy resin and a completely blocked diisocyanate, with stirring. Dilution was made with 588.5 parts of deionized water to obtain a cationic electrodeposition paint.

| Pigment paste | |
|---|---|
| Modified epoxy resin | 5 |
| Titanium oxide | 14 |
| Refined clay | 10 |
| Carbon black | 1 |
| Deionized water | 39.7 |
| Total | 69.7 |

EXAMPLE 5

A cationic electrodeposition paint was obtained in the same manner as in Example 4 with the exception that 100 parts of the dispersion obtained in Example 2 was used as the dispersion of gelled fine particles.

EXAMPLE 6

A cationic electrodeposition paint was obtained in the same manner as in Example 4 with the exception that 100 parts of the dispersion obtained in Example 3 was used as the dispersion of gelled fine particles.

EXAMPLE 7

100 parts of the dispersion containing 20% (as solid content) of gelled fine particles, obtained in Example 1 and 139.4 parts of pigment paste having a solid content of 43% were added to 626 parts of a clear emulsion for cationic electrodeposition (solid content=32%) (Elecron 9600 manufactured by KANSAI PAINT CO., LTD.) comprising a polyester-modified epoxy resin, a completely blocked diisocyanate and a nonionic acrylic resin, with stirring. Dilution was made with 534.6 parts of deionized water to obtain a cationic electrodeposition paint.

COMPARATIVE EXAMPLE 1

A cationic electrodeposition paint was obtained in the same manner as in Example 4 with the exception that no dispersion of gelled fine particles was used.

COMPARATIVE EXAMPLE 2

A cationic electrodeposition paint was obtained in the same manner as in Example 7 with the exception that no dispersion of gelled fine particles was used.

Electrodeposition Coating

In each of the cationic electrodeposition paints obtained in Examples 4–7 and Comparative Examples 1–2 was immersed a cold-rolled dull steel plate of 0.8×300×90 mm (the angle formed by the end and the flat portion was 45°) subjected to a chemical treatment with Palbond #3030 (zinc phosphate type, a product of Nihon Parkerizing Co., Ltd.). Electrodeposition coating was conducted using the above steel plate as a cathode, under the conditions of 30° C. (electrodeposition bath temperature), pH 6.5 and 300 V (applied voltage) to form an electrodeposition paint film having a thickness (as dried) of 20 μm. The film was water-washed and then baked at 185° C. for 20 minutes. Each of the thus obtained coated plates was subjected to the following performance tests and the results are shown in Table 1. In Table 1 is also shown the result of melt viscosity of paint film.
(Items and test methods for performance tests)

(1) Melt Viscosity of Paint Film

Melt viscosity of paint film during baking was determined from the heat flow appearance of pencil scratch based on the melt viscosity by a measuring method using a rolling ball according to JIS Z 0237. Each value shown in Table 1 indicates a minimum viscosity (cP).

(2) Edge-Covering Property

A steel plate having an edge angle of 45° was electrodeposition-coated so that the cured film after baking had a thickness of 20 μm at the flat portion. The coated steel plate was subjected to curing under given baking conditions to prepare a test plate. The test plate was set in a salt spray tester so that the edge was parallel to a vertical line, and subjected to a salt spray test according to JIS Z 2371 and examined for the edge corrosion after 168 hours.
- ⊚: No rusting
- ○: Slight rusting
- Δ: Considerable rusting
- ×: Striking rusting

(3) Surface Smoothness of Paint Film

The surface finish of the electrodeposition paint film of a coated steel plate was evaluated visually.
- ⊚: Good
- ○: Nearly good
- Δ: Slightly poor

(4) Impact Resistance

Measured in accordance with JIS K 5400 8.3.2. (1990) in an atmosphere of 20° C. Each value in Table 1 indicates the maximum height (cm) when the paint film had no damage under the conditions of 500 g (weight) and ½ inch (diameter of an impact tool). The maximum value of impact resistance was taken at 50 cm.

(5) Chipping Resistance

An electrodeposition-coated and baked steel plate was further coated with a thermosetting intermediate coat and a top coat in this order and then subjected to thermal curing. The resulting steel plate as test piece was subjected to the following test.

A test piece was fixed to a supporting stand and crushed stones were air-sprayed onto the test piece under the following conditions.
- Tester: Q-G-R gravelometer manufactured by Q Panel Co.
- Sprayed stones: crushed stones of about 15–20 mm in diameter
- Volume of sprayed stones: about 500 ml
- Air pressure for spraying: about 4 kg/cm$^2$
- Temperature during spraying: about 20° C.

Then, the condition of the paint film surface of the test piece was observed visually and rated according to the following yardstick.
- ⊚ (Good: Scars formed by impact were seen very slightly in the top coat film, and the electrodeposition paint film showed no peeling.
- ○ (Slightly poor): Scars formed by impact were seen in the top coat film and the intermediate coat film, and the electrodeposition paint film showed slight peeling.
- Δ (Poor) Scars formed by impact were seen in a large number in the top coat film and the intermediate coat film, and the electrodeposition paint film showed considerable peeling.

(6) Adhesion After Dipping in Hot Water

A coated steel plate was dipped in water of 40° C. for 20 days. Then, the paint film of the resulting plate was cross-cut in accordance with JIS K 5400 8.5.2 (1990); a pressure-sensitive adhesive cellophane tape was attached thereto; the tape was quickly peeled; and the condition of the paint film was examined.
- ⊚: The paint film showed no abnormality.
- Δ: The edge of the cross-cut of the paint film was peeled slightly.
- ×: Part of the paint film was peeled.

(7) Salt Spray Resistance

The electrodeposition paint film of a coated steel plate was cross-cut with a knife so that the cut reached the steel portion. Then, the plate was subjected to a 1,000-hour salt spray test according to JIS Z 2371 and the width of rusting and swelling developed from the knife cut was measured.

(8) Weather Resistance of Two Coats

On an electrodeposition-coated and baked steel plate was further coated an aminoalkyd resin type paint (Amilac Clear, a product of KANSAI PAINT CO., LTD. ) in a thickness of 35 μm, followed by baking at 140° C. for 15 minutes. The resulting coated plate was exposed in a sunshine weatherometer for 20 hours and then dipped in water of 40° C. for 20 hours, after which the plate was crosscut and subjected to a peeling test with a pressure-sensitive adhesive cellophane tape. This test was repeated to examine a time in which peeling occurred.

TABLE 1

|  | Ex. | | | | Co. Ex. | |
| --- | --- | --- | --- | --- | --- | --- |
|  | 4 | 5 | 6 | 7 | 1 | 2 |
| Melt viscosity of paint film | $10^6$ | $10^6$ | $10^6$ | $10^6$ | $10^2$ | $10^2$ |
| Edge-covering property | ⊚ | ⊚ | ⊚ | ⊚ | x | x |
| Surface smoothness of paint film | ⊚ | ⊚ | ⊚ | ⊚ | ⊙ | ⊙ |
| Impact resistance (cm) | 50 | 50 | 50 | 50 | 40 | 40 |
| Chipping resistance | ⊚ | ⊚ | ⊚ | ⊚ | ⊙ | ⊙ |
| Adhesion after dipping in hot water | ⊚ | ⊚ | ⊚ | ⊚ | ⊙ | ⊙ |
| Salt spray resistance | 1.0 | 1.0 | 1.0 | 2.0 | 2.0 | 2.5 |
| Weather resistance of two coats | 40 | 40 | 40 | 180 | 40 | 180 |

[Part II]

Preparation of Epoxy Resin-Amine Adducts Having Hydrolysable Alkoxysilane groups

PREPARATION EXAMPLE 4

An epoxy resin-amine adduct having hydrolysable alkoxysilane groups was prepared in accordance with the following compounding recipe.

| Raw materials | Parts by weight |
| --- | --- |
| Epon 828EL | 1140 |
| Bisphenol A | 456 |
| Amine A | 28.95 |
| Amine A (post-addition) | 270.2 |
| Amine B | 95.4 |
| Deionized water | 10.0 |
| KBE-402 | 74.5 |
| Ethylene glycol monobutyl ether | 490.6 |

Into a reactor provided with a thermometer, a stirrer, a reflux condenser and a nitrogen gas inlet tube were charged Epon 828EL, bisphenol A and amine A with nitrogen gas being blown thereinto. The Reactor contents were heated to 160° C. and reacted until the epoxy equivalent of the reaction mixture reached a theoretical value (868). The reaction mixture was cooled to 100° C., and amine A and amine B were added. The mixture was reacted until the tertiary amine value of the reaction mixture reached a theoretical value (60.3). Then, deionized water was added and a reaction for hydrolysis of ketimine was conducted at 100° C. Subsequently, KBE-402 was added and a reaction was conducted at 100° C. until no epoxy group was present. Thereafter, dilution was made with ethylene glycol monobutyl ether to obtain a solution containing 70% (as solid content) of an epoxy resin-amine adduct having hydrolysable alkoxysilane groups, having a number-average molecular weight of about 1,800.

PREPARATION EXAMPLE 5

An epoxy resin-amine adduct having hydrolysable alkoxysilane groups was prepared in accordance with the following compounding recipe.

| Raw materials | Parts by weight |
| --- | --- |
| Epon 828EL | 1140 |
| Bisphenol A | 456 |

-continued

| Raw materials | Parts by weight |
| --- | --- |
| Amine A | 28.95 |
| Amine A (post-addition) | 183.4 |
| KBM-573*[9] | 114.93 |
| Amine B | 95.4 |
| Ethylene glycol monobutyl ether | 564.7 |

*[9]N-phenyl-γ-aminopropyltrimethoxysilane manufactured by Shin-Etsu Chemical Co., Ltd.

Into the same reactor as used in Preparation Example 4 were charged Epon 828EL, bisphenol A and amine A with nitrogen gas being blown thereinto. The reactor contents were heated to 160° C. and reacted until the epoxy equivalent of the reaction mixture reached a theoretical value (803). The reaction mixture was cooled to 70° C., and amine A, KBE-573 and amine B were added. The mixture was reacted until the tertiary amine value of the reaction mixture reached a theoretical value (57.4). Then, dilution was made with ethylene glycol monobutyl ether to obtain a solution containing 70% (as solid content) of an epoxy resin-amine adduct having hydrolysable alkoxysilane groups, having a number-average molecular weight of about 1,800.

Preparation of Epoxy Resin-Amine Adduct (for Comparative Examples)

PREPARATION EXAMPLE 6

An epoxy resin-amine adduct was prepared in accordance with the following compounding recipe.

| Raw materials | Parts by weight |
| --- | --- |
| Epon 828EL | 1140 |
| Bisphenol A | 456 |
| Amine A | 28.95 |
| Amine A (post-addition) | 270.2 |
| Amine B | 95.4 |
| Ethylene glycol monobutyl ether | 468.7 |

Into the same reactor as used in Preparation Example 4 were charged Epon 828EL, bisphenol A and amine A with nitrogen gas being blown thereinto. The reactor contents were heated to 160° C. and reacted until the epoxy equivalent of the reaction mixture reached a theoretical value (813). The reaction mixture was cooled to 100° C., and amine A and amine B were added. The mixture was reacted until the tertiary amine value of the reaction mixture reached a theoretical value (60.3). Then, dilution was made with ethylene glycol monobutyl ether to obtain a solution containing 70% (as solid content) of an epoxy resin-amine adduct having a number-average molecular weight of about 1,700.

Preparation of Oxime-blocked Polyisocyanate Compound

PREPARATION EXAMPLE 7

Into the same reactor as used in Preparation Example 4 was charged 510 parts of diphenylmethane-4,4'-diisocyanate with nitrogen gas being blown thereinto. The flask contents were heated to 80° C. and 68 parts of trimethylolpropane was charged with care given to heat generation. A reaction was conducted until the NCO value (*10) of the reaction mixture reached a theoretical value (159). Then, 222 parts of methyl ethyl ketoxime was dropwise added with care given to heat generation, and a reaction was conducted until the NCO value of the reaction mixture reached a theoretical value (0). Thereafter, 200 parts of methyl isobutyl ketone was added for dilution to obtain a methyl isobutyl ketone solution containing 80% (as solid content) of an adduct between a polyisocyanate compound and an oxime compound, having 2.5-functional isocyanate groups and an average molecular weight of about 392.

*10 The sample was dissolved in dioxane and a dibutylamine solution was added thereto in excess to add the amine to the NCO groups. The residual amine was back-titrated with an acid. The NCO value of the sample (NCO milligrams contained in 1 g of the sample) was determined from the amount of the acid used.

Preparation of Dispersions of Cationically Electrodepositable Fine Particles

EXAMPLE 8

In a two-liter flask were thoroughly mixed 228 parts of the epoxy resin-amine adduct having hydrolyable alkoxysilane groups, obtained in Preparation Example 4 and 50.0 parts of the oxime-blocked polyisocyanate compound obtained in Preparation Example 7. Thereto was added 32 parts of 10% acetic acid. The mixture was stirred at 30° C. for 5 minutes. Thereto was dropwise added 690 parts of deionized water in 30 minutes with vigorous stirring. The mixture was heated to 50° C. and stirred for about 3 hours.

Thus there was obtained an opaque white dispersion of gelled fine particles subjected to intraparticle cross-linking, having a solid content of 20%. The fine particles had an average particle diameter of 0.15 $\mu$m in ethylene glycol monobutyl ether.

EXAMPLE 9

In a two-liter flask were thoroughly mixed 228 parts of the epoxy resin-amine adduct having hydrolysable alkoxysilane groups, obtained in Preparation Example 4 and 50.0 parts of the oxime-blocked polyisocyanate compound obtained in Preparation Example 7. Thereto was added 32 parts of 10% acetic acid. The mixture was stirred at 30° C. for 5 minutes. Thereto was dropwise added 690 parts of deionized water in 30 minutes with vigorous stirring to obtain a dispersion having a solid content of 20%.

EXAMPLE 10

In a two-liter flask were thoroughly mixed 228 parts of the epoxy resin-amine adduct having hydrolysable alkoxysilane groups, obtained in Preparation Example 5 and 50.0 parts of the oxime-blocked polyisocyanate compound obtained in Preparation Example 7. Thereto was added 42 parts of 10% acetic acid. The mixture was stirred at 30° C. for 5 minutes. Thereto was dropwise added 680 parts of deionized water in 30 minutes with vigorous stirring. The mixture was heated to 50° C. and stirred for about 3 hours.

Thus there was obtained an opaque white dispersion of gelled fine particles subjected to intraparticle cross-linking, having a solid content of 20%. The fine particles had an average particle diameter of 0.15 $\mu$m in ethylene glycol monobutyl ether.

EXAMPLE 11

In a two-liter flask were thoroughly mixed 228 parts of the epoxy resin-amine adduct having hydrolysable alkoxysilane groups, obtained in Preparation Example 4 and 40.0 parts of Epon 828EL. Thereto was added 32 parts of 10% acetic acid. The mixture was stirred at 30° C. for 5 minutes. Thereto was dropwise added 700 parts of deionized water in 30 minutes with vigorous stirring. The mixture was heated to 50° C. and stirred for about 3 hours.

Thus there was obtained an opaque white dispersion of gelled fine particles subjected to intraparticle cross-linking, having a solid content of 20%. The fine particles had an average particle diameter of 0.16 $\mu$m in ethylene glycol monobutyl ether.

EXAMPLE 12

In a two-liter flask were thoroughly mixed 228 parts of the epoxy resin-amine adduct having hydrolysable alkoxysilane groups, obtained in Preparation Example 5 and 40.0 parts of DEN-438 (*11). Thereto was added 32 parts of 10% acetic acid. The mixture was stirred at 30° C. for 5 minutes. Thereto was dropwise added 700 parts of deionized water in 30 minutes with vigorous stirring. The mixture was heated to 50° C. and stirred for about 3 hours.

Thus there was obtained an opaque white dispersion of gelled fine particles subjected to intraparticle cross-linking, having a solid content of 20%. The fine particles had an average particle diameter of 0.16 $\mu$m in ethylene glycol monobutyl ether.

*11 A 3.6-functional novolac epoxy resin available from Dow Chemical K.K.

EXAMPLE 13

In a two-liter flask were thoroughly mixed 220 parts of the epoxy resin-amine adduct having hydrolysable alkoxysilane groups, obtained in Preparation Example 5 and 40.0 parts of DEN-438. Thereto was added 32 parts of 10% acetic acid. The mixture was stirred at 30° C. for 5 minutes. Thereto was dropwise added 700 parts of deionized water in 30 minutes with vigorous stirring, whereby an aqueous dispersion having a solid content of 20% was obtained.

COMPARATIVE EXAMPLE 3

In a two-liter flask were thoroughly mixed 228 parts of the epoxy resin-amine adduct obtained in Preparation Example 6 and 50 parts of the oxime-blocked polyisocyanate compound obtained in Preparation Example 7. Thereto was added. 35 parts of 10% acetic acid. The mixture was stirred at 30° C. for 5 minutes. Thereto was dropwise added 690 parts of deionized water in 30 minutes with vigorous stirring. The mixture was heated to 50° C. and stirred for about 3 hours.

Thus there was obtained an opaque white dispersion of gelled fine particles subjected to intraparticle cross-linking, having a solid content of 20%. The fine particles had an average particle diameter of 0.15 $\mu$m in ethylene glycol monobutyl ether.

COMPARATIVE EXAMPLE 4

In a two-liter flask were thoroughly mixed 228 parts of the epoxy resin-amine adduct obtained in Preparation Example 6 and 40.0 parts of DEN-438. Thereto was added 36 parts of 10% acetic acid. The mixture was stirred at 30° C. for 5 minutes. Thereto was dropwise added 700 parts of deionized water in 30 minutes with vigorous stirring. The mixture was heated to 50° C. and stirred for about 3 hours.

Thus there was obtained an opaque white dispersion of gelled fine particles subjected to intraparticle cross-linking, having a solid content of 20%. The fine particles had an average particle diameter of 0.15 μm in ethylene glycol monobutyl ether.

Preparation of Cationic Electrodeposition Paint Compositions

EXAMPLE 14

100 parts of the dispersion containing 20% (as solid content) of gelled fine particles, obtained in Example 8 and 193.4 parts of the following pigment paste having a solid content of 43% were added to 572 parts of a clear emulsion for cationic electrodeposition (solid content=35%) (Elecron 9450 manufactured by KANSAI PAINT CO., LTD.) comprising a polyamide-modified epoxy resin and a completely blocked diisocyanate, with stirring. Dilution was made with 588.5 parts of deionized water to obtain a cationic electrodeposition paint.

| Pigment paste | |
| --- | --- |
| Modified epoxy resin | 5 |
| Titanium oxide | 14 |
| Refined clay | 10 |
| Carbon black | 1 |
| Deionized water | 39.7 |
| Total | 69.7 |

EXAMPLE 15

A cationic electrodeposition paint was obtained in the same manner as in Example 14 with the exception that 100 parts of the dispersion obtained in Example 9 was used as the dispersion of gelled fine particles.

EXAMPLE 16

A cationic electrodeposition paint was obtained in the same manner as in Example 14 with the exception that 100 parts of the dispersion obtained in Example 10 was used as the dispersion of gelled fine particles.

EXAMPLE 17

100 parts of the dispersion containing 20% (as solid content) of gelled fine particles, obtained in Example 11 and 139.4 parts of the above pigment paste having a solid content of 43% were added to 626 parts of a clear emulsion for cationic electrodeposition (solid content=32%) (Elecron 9600 manufactured by KANSAI PAINT CO., LTD. ) comprising a polyester-modified epoxy resin, a completely blocked diisocyanate and a nonionic acrylic resin, with stirring. Dilution was made with 534.6 parts of deionized water to obtain a cationic electrodeposition paint.

EXAMPLE 18

A cationic electrodeposition paint was obtained in the same manner as in Example 17 with the exception that 100 parts of the dispersion obtained in Example 12 was used as the dispersion of gelled fine particles.

EXAMPLE 19

A cationic electrodeposition paint was obtained in the same manner as in Example 17 with the exception that 100 parts of the dispersion obtained in Example 13 was used as the dispersion of gelled fine particles.

COMPARATIVE EXAMPLE 5

A cationic electrodeposition paint was obtained in the same manner as in Example 14 with the exception that no dispersion of gelled fine particles was used.

COMPARATIVE EXAMPLE 6

A cationic electrodeposition paint was obtained in the same manner as in Example 17 with the exception that no dispersion of gelled fine particles was used.

COMPARATIVE EXAMPLE 7

A cationic electrodeposition paint was obtained in the same manner as in Example 17 with the exception that 100 parts of the dispersion obtained in Comparative Example 3 was used as the dispersion of gelled fine particles.

COMPARATIVE EXAMPLE 8

A cationic electrodeposition paint was obtained in the same manner as in Example 17 with the exception that 100 parts of the dispersion obtained in Comparative Example 4 was used as the dispersion of gelled fine particles.

Electrodeposition Coating

In each of the cationic electrodeposition paints obtained in Examples 14–19 and Comparative Examples 5–8 was immersed a cold-rolled dull steel plate of 0.8×300×90 mm (the angle formed by the end and the flat portion was 45°) subjected to a chemical treatment with Palbond #3030 (zinc phosphate type, a product of Nihon Parkerizing Co., Ltd.). Electrodeposition coating was conducted using the above steel plate as a cathode, under the conditions of 30° C. (electrodeposition bath temperature), pH 6.5 and 300 V (applied voltage) to form an electrodeposition paint film having a thickness (as dried) of 20 μm. The film was water-washed and then baked at 185° C. for 20 minutes. Each of the thus obtained coated plates was subjected to the following performance tests and the results are shown in Table 2. In Table 2 is also shown the result of melt viscosity of paint film. (Items and test methods for performance tests)

The same description as given previously applies.

TABLE 2

| | Ex. | | | | | | Co. Ex. | | | |
| --- | --- | --- | --- | --- | --- | --- | --- | --- | --- | --- |
| | 14 | 15 | 16 | 17 | 18 | 19 | 5 | 6 | 7 | 8 |
| Melt viscosity of paint film | $10^6$ | $10^5$ | $10^6$ | $10^6$ | $10^6$ | $10^5$ | $10^2$ | $10^2$ | $10^4$ | $10^4$ |
| Edge-covering property | ⊙ | ⊙ | ⊙ | ⊙ | ⊙ | ⊙ | x | x | Δ | Δ |
| Surface smoothness of paint film | ⊙ | ⊙ | ⊙ | ⊙ | ⊙ | ⊙ | ⊙ | ⊙ | Δ | Δ |
| Impact resistance (cm) | 50 | 50 | 50 | 50 | 50 | 50 | 40 | 40 | 50 | 50 |
| Chipping resistance | ⊙ | ⊙ | ⊙ | ⊙ | ⊙ | ⊙ | ○ | ○ | Δ | Δ |
| Adhesion after dipping in hot water | ⊙ | ⊙ | ⊙ | ⊙ | ⊙ | ⊙ | ⊙ | ⊙ | ⊙ | ⊙ |
| Salt spray resistance | 1.0 | 1.0 | 1.0 | 2.0 | 2.0 | 2.0 | 2.0 | 2.5 | 2.0 | 2.0 |

TABLE 2-continued

|  | Ex. |  |  |  |  |  | Co. Ex. |  |  |  |
| --- | --- | --- | --- | --- | --- | --- | --- | --- | --- | --- |
|  | 14 | 15 | 16 | 17 | 18 | 19 | 5 | 6 | 7 | 8 |
| Weather resistance of two coats | 40 | 40 | 40 | 180 | 180 | 180 | 40 | 180 | 180 | 180 |

What is claims is:

1. Cationically electrodepositable gelled fine particles which are obtained by subjecting fine particles of a mixture of (A) an epoxy resin-amine adduct having hydrolyzable alkoxysilane groups and (B) at least one compound selected from the group consisting of (B-i) a polyisocyanate compound blocked with an oxime compound and (B-2) a polyepoxide compound to intraparticle crosslinking at least partially in the presence of water; said epoxy resin-amine adduct having hydrolyzable alkoxysilane groups (A) being produced by (1) adding an alkoxysilane group-containing amine or mercaptan compound to the epoxy groups of an epoxy resin-amine adduct, (2) by adding an alkoxysilane group-containing epoxy compound to the amine groups of an epoxy resin-amine adduct, or (3) by adding an alkoxysilane group-containing isocyanate compound to the hydroxyl and amino groups of an epoxy resin-amine adduct; said polyepoxide compound (B-2) being obtained by a reaction between a polyphenol compound and epichlorohydrin; and the fine particles having a diameter of 0.5 μm or less.

2. The fine particles of claim 1, wherein each hydrolyzable alkoxysilane group is a group represented by

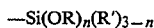

wherein R represents alkyl, alkoxyalkyl, alkanoyloxyalkyl, alkenylcarbonyloxyalkyl, cycloalkyl, aralkyl, oxime,

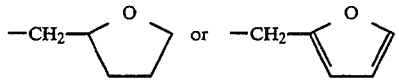

R' represents an alkyl group having 5 or less carbon atoms; and n is 2 or 3.

3. The fine particles of claim 1, wherein the epoxy resin-amine adduct having hydrolysable alkoxysilane groups has an alkoxysilane equivalent in the range of 500-200,000.

4. The fine particles of claim 3, wherein the alkoxysilane equivalent is in the range of 1,000-40,000.

5. The fine particles of claim 1, which are obtained by dispersing an epoxy resin-amine adduct having hydrolysable alkoxysilane groups in an aqueous medium in the form of fine particles and then subjecting the dispersed fine particles to internal crosslinking.

6. The fine particles of claim 1, wherein the polyepoxide compound (B-2) has a number-average molecular weight of 400-4,000 and an epoxy equivalent of 200-2,000.

7. The fine particles of claim 1, wherein the adduct (A) and the compound (B) are mixed so that the molar equivalent ratio of the total of the isocyanate groups and epoxy groups in the compound (B) to the amino groups in the adduct (A) becomes 0.3-20.

8. The fine particles of claim 1, which are obtained by dispersing a mixture of the adduct (A) and the compound (B) in an aqueous medium in the form of fine particles and, subjecting the fine particles dispersed in the aqueous medium to internal crosslinking at least partially.

9. A cationic electrodeposition paint composition comprising the gelled fine particles of claim 1 in an amount of 1-35% by weight based on (the) weight of total resin solids of the paint composition.

10. The fine particles of claim 1, wherein the blocked polyisocyanate compound (B-1) is prepared by blocking, with oxime compound, a polyisocyanate compound selected from the group consisting of diphenyl methane diisocyanate, tolylene diisocyanate and a poly(diphenyl methane diisocyanate), and isocyanate-terminated prepolymers of said polyisocyanate compounds and polyols.

* * * * *